(12) United States Patent
Salz

(10) Patent No.: US 6,890,024 B2
(45) Date of Patent: May 10, 2005

(54) LAMELLAR ROOF

(75) Inventor: Wolfram Salz, Vaihingen/Enz (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/675,531

(22) Filed: Sep. 30, 2003

(65) Prior Publication Data

US 2004/0090091 A1 May 13, 2004

Related U.S. Application Data

(63) Continuation-in-part of application No. PCT/EP02/04013, filed on Apr. 10, 2002.

(30) Foreign Application Priority Data

Apr. 20, 2001 (DE) .......................................... 101 19 701

(51) Int. Cl.[7] ............................................... B60J 7/047
(52) U.S. Cl. .................................................. 296/220.01
(58) Field of Search ..................................... 296/220.01

(56) References Cited

U.S. PATENT DOCUMENTS 6,457,771 B2 * 10/2002 Farber .................... 296/220.01
6,502,898 B1 * 1/2003 Salz ....................... 296/220.01

FOREIGN PATENT DOCUMENTS

| DE | 195 29 702 | 9/1996 |
| DE | 196 08 916 | 4/1997 |
| DE | 197 20 822 | 3/1999 |
| DE | 198 56 873 | 2/2000 |
| DE | 199 27 654 | 7/2000 |
| WO | WO99/11479 | 3/1999 |

* cited by examiner

Primary Examiner—Dennis H. Pedder
(74) Attorney, Agent, or Firm—Klaus J. Bach

(57) ABSTRACT

In a lamellar roof for a motor vehicle a support structure for the roof lamella section is provided in which the guide and operating mechanism is simplified and tolerance variations are reduced and which provides for firm support of the roof lamella sections also when the roof is open to avoid rattling noises. This is achieved in that the lamella sections are supported by lamella carriers and each lamella carrier is supported on two adjacent guide carriages, and a control rocker is provided on each carriage so as to be movable out of a basic closed position to a roof opening position, in which it raises the rear edges of said lamella sections to tilt the lamella section upwardly, the guide carriage of said front lamella section carrier and the control rocker projecting, in opening direction, beyond said connection and being supported, in the projecting area, on the lamella carrier.

20 Claims, 5 Drawing Sheets

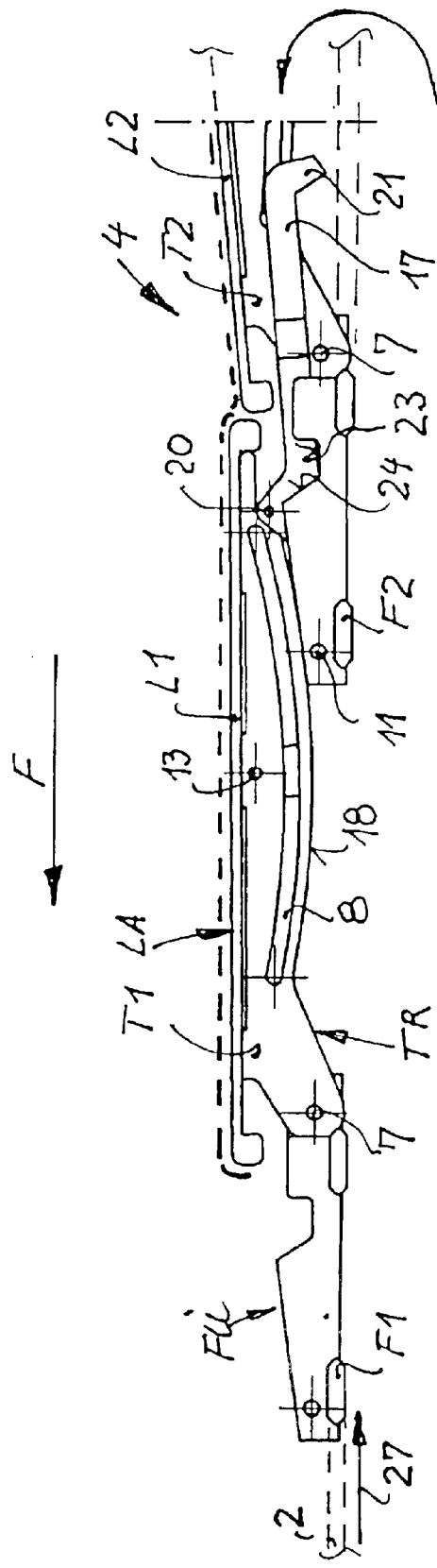
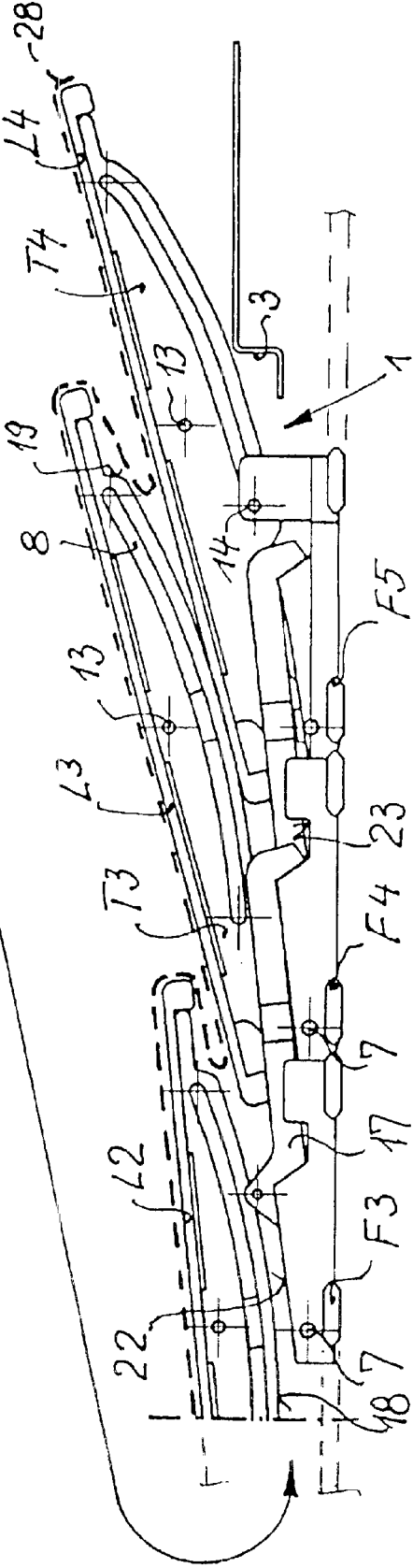
Fig. 2

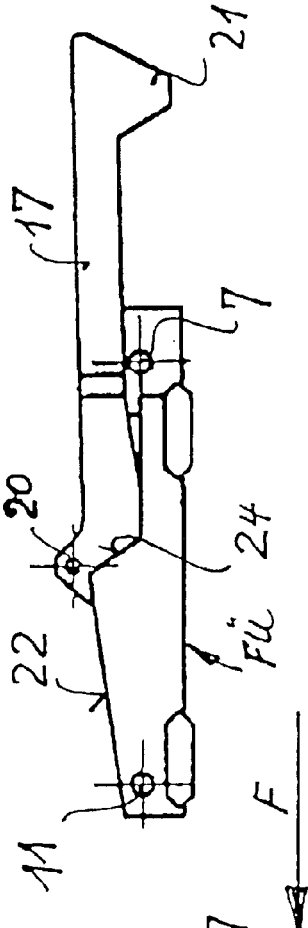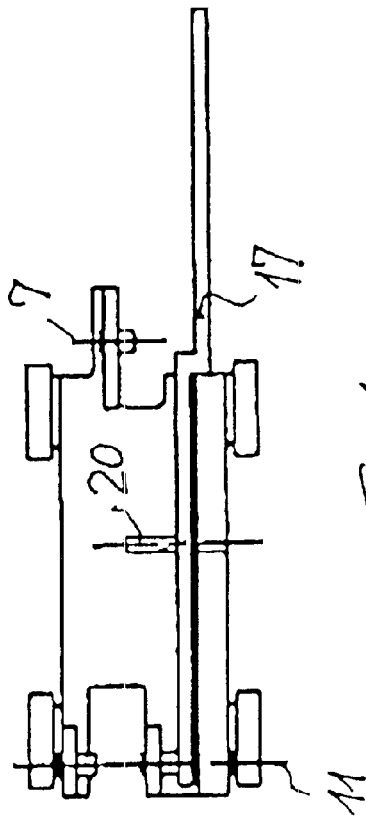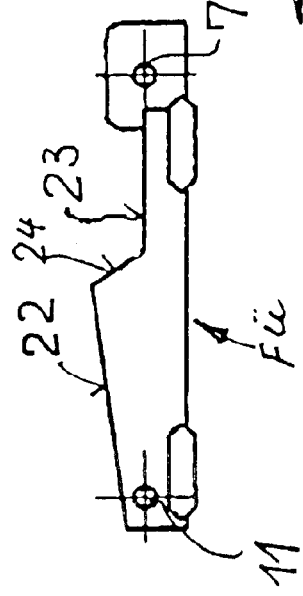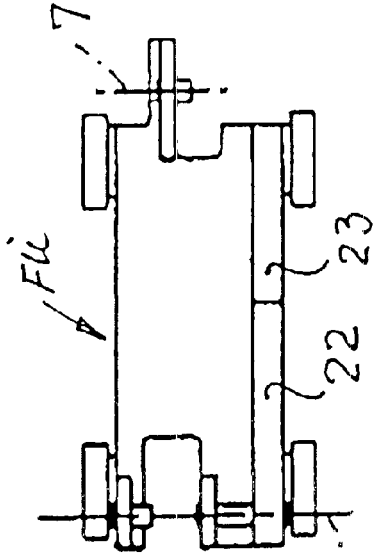

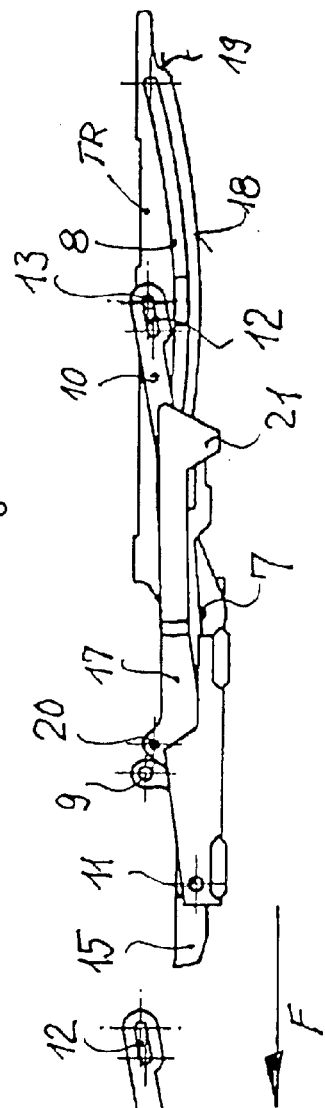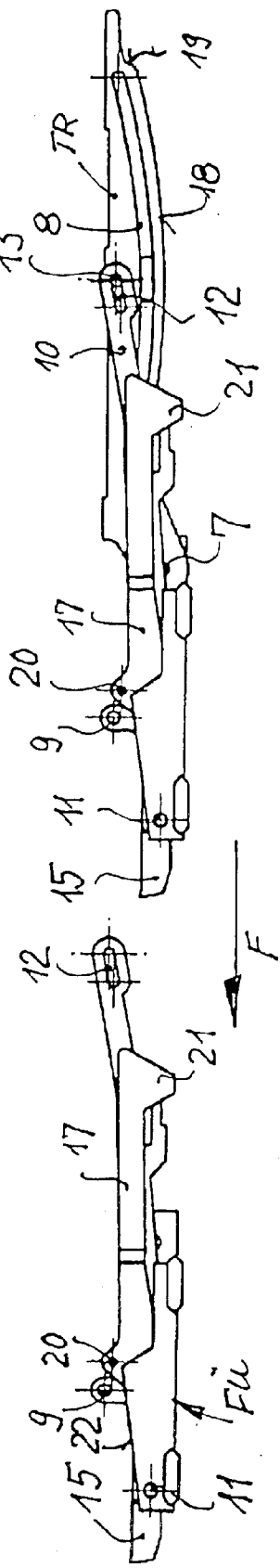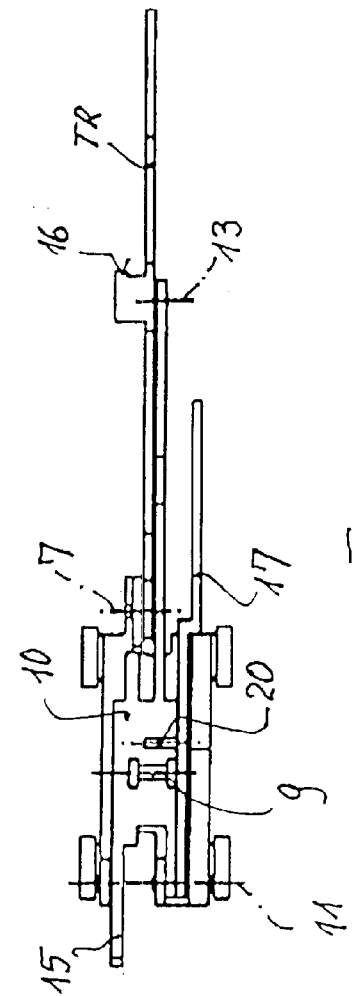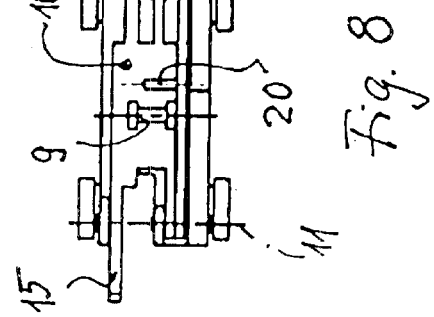

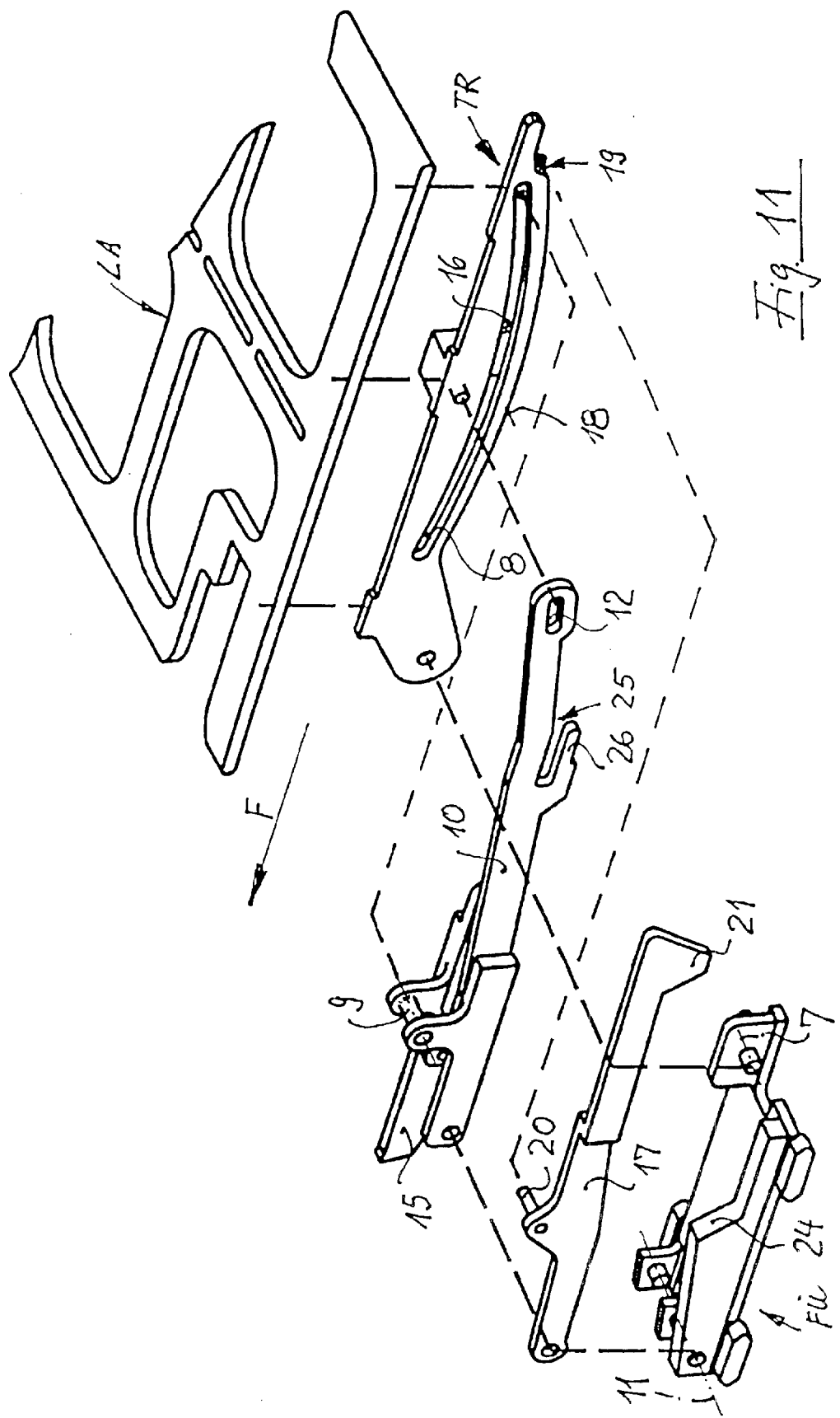

LAMELLAR ROOF

This is a Continuation-in-Part application of international application PCT/EP02/04013 filed Apr. 10, 2002 and claiming the priority of German application 101 19 701.2 filed Apr. 20, 2001.

BACKGROUND OF THE INVENTION

The present invention relates to a lamellar roof for a roof opening of a motor vehicle including at least two lamella sections, which are mounted in the roof opening and which are supported on tracks so as to be movable between a closed position in which they close the roof opening and an open position in which they are tilted upwardly in the rear and moved backwardly into a sandwiched position essentially out of the roof opening.

Such a lamellar roof is known for example from DE 199 24 654 C1. In the lamellar roof structure disclosed therein, the upward tilting of the rear ends of the lamellas is achieved by a positive coupling of the lamella carrier of the first lamella with a control rocker of the next adjacent carrier of the second lamella. The control rocker of the next adjacent lamella carrier is guided by way of a support pin in a guide slot of the first lamella so that, because of the positive coupling, the first lamella is tilted upwardly when the next, rearwardly adjacent lamella is tilted up. The positive coupling is realized in that the lamella carrier of the rear lamella and the control rocker cooperating with the front lamella are supported on a guide carriage in a longitudinally overlapping relationship and are interconnected in the overlap area by a pivot shaft which is supported in a guide slot.

The advantages of such a design are a basically a simple arrangement, high operational reliability and low space requirements. However, the guide structure has to accommodate relatively large forces and must be manufactured with small tolerances so that such a solution has relatively high manufacturing accuracy requirements.

It is therefore the object of the present invention to provide a lamellar roof, which is relatively easy and inexpensive to manufacture and provides for functional possibilities not available in the prior art arrangement.

SUMMARY OF THE INVENTION

In a lamellar roof for a motor vehicle a support structure for the roof lamella section is provided in which the guide and operating mechanism is simplified and tolerance variations are reduced and which provides for firm support of the roof lamella sections also when the roof is open to avoid rattling noises. This is achieved in that the lamella sections are supported by lamella carriers and each lamella carrier is supported on two adjacent guide carriages, and a control rocker is provided on each carriage so as to be movable out of a basic closed position to a roof opening position, in which it raises the rear edges of said lamella sections to tilt the lamella section upwardly, the guide carriage of said front lamella section carrier and the control rocker projecting, in opening direction, beyond said connection and being supported, in the projecting area, on the lamella carrier.

With the arrangement according to the invention, lever lengths can be used which require only relatively small operating forces to actuate and move the roof sections and which also limit the need for small tolerances. In addition, the overlap of the control rocker and the lamella, which in the travel direction of the vehicle is in front of the control rocker, can be advantageously used to support this lamella in the opening direction of the lamellar roof and also in the opposite direction with respect to the rear guide carriage. This also permits a locking of the rear lamella depending on the tilt angle.

A slide engagement of adjacent guide carriages can be combined in the arrangement according to the invention with little efforts with an interlocking of the guide carriages, which abut each other when the lamellar roof is in an open position. The locking levers provided herefor may be connected to the respective guide carriage preferably co-axially with the control rocker which is relatively simple and also not tolerance-sensitive.

Furthermore, the locking lever may advantageously have a double function, that is, as described above, it may be used for the interlocking of the carriages when they abut one another and also as stop for the, in travel direction, front lamella or, respectively, its carriage. This stop can be used additionally for providing a longitudinally firm engagement of adjacent lamella carriers by way of the respective control rockers when appropriately designed. As a result, the respective engagement surfaces are subjected only to lower loads. They may also be so designed that in the locking positions, the respective abutment surfaces are firmly engaged with each other which is important for securing the roof structure to provide rigidity and to avoid rattling noises.

The invention can be realized with guide carriages of relatively small size and with a compact configuration of the guide mechanism. Expediently a stacking structure in the transverse vehicle direction is provided with locking levers arranged at the transverse outer sides of the vehicle and control rockers arranged inwardly adjacent the locking levers toward the center of the vehicle and lamella carriers disposed adjacent the control rockers so that also in the overlap area of the parts, the arrangement is relatively narrow. The lamella carriers may have at their inner sides toward the center of the vehicle projections, which serves as stops for the guide rockers of the following guide carriage.

Because the locking lever, the control rocker and the lamella carrier, which are associated with a particular guide carriage and supported thereon, are also oriented in the slide direction of the lamellar roof and in an overlapping relationship and because, in the open position of the lamellar roof and with the guide carriages being disposed adjacent one another, not only the upward tilted roof lamellas with the associated lamella carriers overlap in the slide direction of the roof but also the locking levers and the control rockers of subsequent guide carriages, the control rockers can be utilized for supporting the lamella carriers against the guide carriage which is next adjacent in the opening direction of the lamellar roof. It is in this respect particularly advantageous to utilize the support pin of the control rocker, which is supported on the rearwardly adjacent guide carriage and which is guided in the guide grooves of a lamella carrier, as coupling element for the control rocker which is supported on the preceding guide carriage and which is locked when this guide carriage engages the support pin. With such a support arrangement, control rockers of subsequent guide carriages form support triangles, which stiffen the arrangement of outwardly tilted lamellas. The respective engagement of the control rockers, which are coupled together by way of the support pins, increases the rigidity of the structure.

Further details and features of the invention will be described below on the basis of the accompanying drawings.

BRIEF DESCRIPTION OF THE DRAWINGS

FIG. 2 is a view similar to that of FIG. 1 showing the arrangement however from the opposite side with the control rocker disposed between the lamella carrier and the locking lever not shown for clarity reasons, FIGS. 3 and 4 show schematically a guide carriage in side and respectively, top views, FIGS. 5 and 6 show the guide carriage of FIGS. 3 and 4 in a side and, respectively, top views with a locking element in the form of a locking lever supported thereon, FIGS. 7 and 8 show a guide carriage as shown in FIGS. 3 and 4 in side and, respectively, top views with a control rocker supported thereon, FIGS. 9 and 10 show a guide carriage as shown in FIGS. 3, 5 and 7 and 4, 6, and 8 wherein also a lamella carrier is shown pivotally supported on the guide carriage by a pivot shaft, and FIG. 11 shows schematically a guide carriage according to FIGS. 9 and 10 in an exploded view to show the various parts of the guide mechanism in a perspective view.

DESCRIPTION OF A PREFERRED EMBODIMENT

Figure 1:
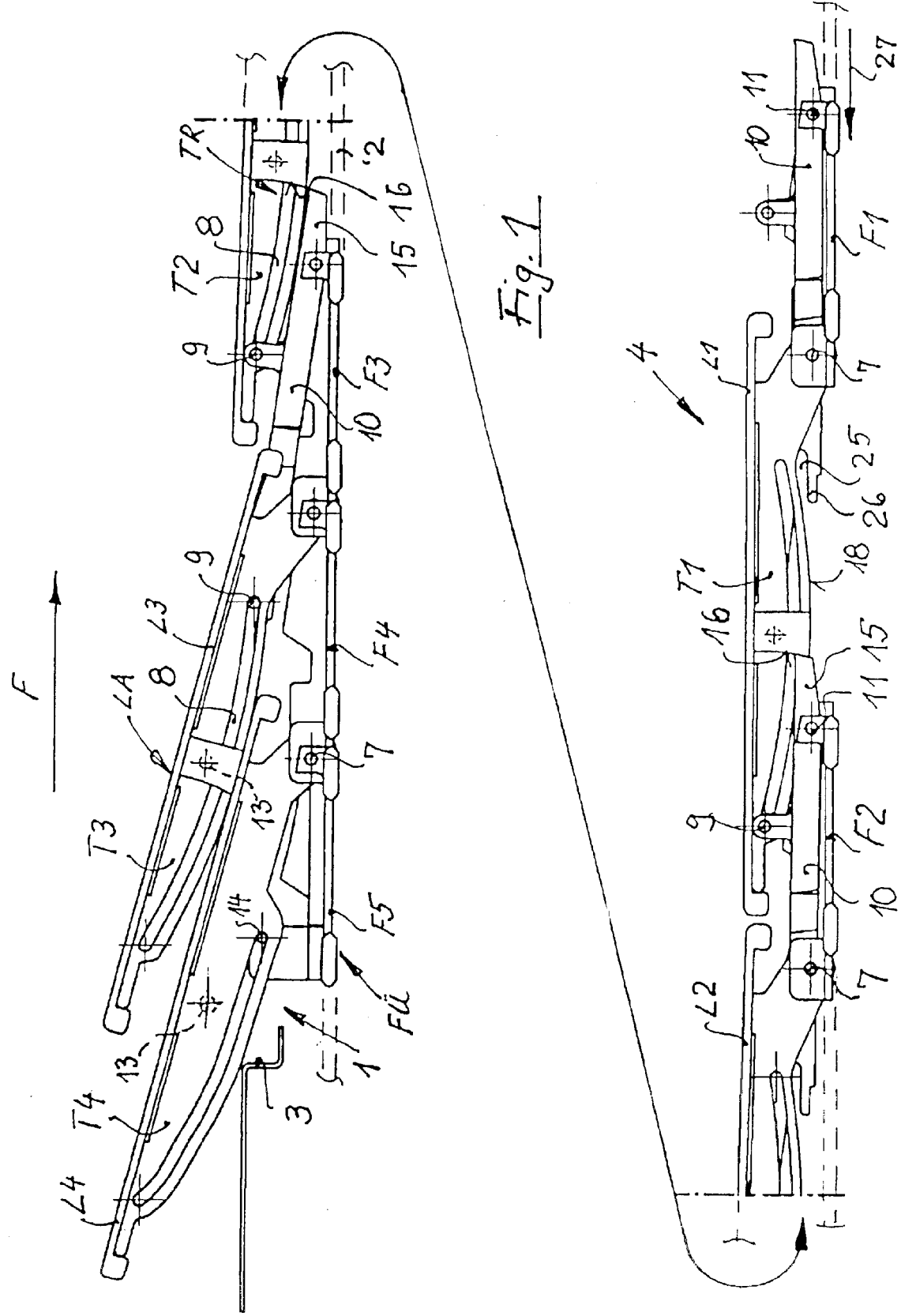
FIG. 1 shows schematically the lamellas of a vehicle lamellar roof, which extend transverse to a roof opening and which are supported on guide carriages guided in guide tracks extending at opposite sides of the roof opening in the longitudinal vehicle direction and which, in a closed position, form a flat structure covering the roof opening. In the open position the lamellas are tilted upwardly at their rear ends and moved backwardly toward the rear end of the roof opening into an overlapping relationship. The figure shows the roof partially open with the upwardly tilted rear lamellas being supported at their front ends on the guide carriages.

FIGS. 1 and 2 shows a lamellar vehicle roof according to the invention, partially opened that is moved toward the rear end of the roof opening 1 of the vehicle and supported in guide tracks 2 extending along the roof opening 1 up to the rear delimitation 3 of the roof opening 1. When the lamellar roof 4 is closed, the roof opening 1 is covered by the lamellas LA, specifically lamellas L1 to L4, which then form a closed sealed flat structure. In the partially open position as shown in FIGS. 1 and 2, the lamellas L2 to L4 are inclined upwardly and as shown for the lamellas L3 and L4 in an overlapping relationship. In this position, the lamellas have been moved in a direction opposite to the direction of the arrow F, which indicates the forward travel direction of the vehicle.

The lamellas L1 to L4 are supported on the vehicle body by way of the guide carriages FÜ, that is carriages F1 to F5. Each of the lamellas is supported on two guide carriages F Ü, for example, the lamella L1 is supported on the guide carriages F1 and F2 and the lamella L2 is supported on the guide carriages F2 and F3. Accordingly, adjacent lamellas such as L1 and L2 are supported at their interface area by the guide carriage F2.

The following description of the invention is directed mainly to the description of the guide structure arranged in the transition area between two adjacent lamellas LA, for example the guide carriage F2. The guide carriage F2 is connected to the lamella carriers T1 and T2.

Each of the lamellas L1 to L4 is pivotally supported on the guide carriage F1 to F4, which is in front, in the closing direction of the roof. The respective pivot axes are designated by the reference numeral 7 and are arranged—in the vehicle driving direction F—at the rear end of the respective guide carriages F1 to F4. The respective lamellas L1 to L4 are connected to the respective guide carriages F1 to F5 by way of the lamella carriers T1 to T4, which are provided with downwardly curved guide slots 8 into which guide pins 9 extend. Each guide pin 9 is mounted on a control rocker 10, which is supported on the guide carriage F1 to F4 disposed to the rear of the respective lamella. The control rocker 10 is supported by a pivot axis 11 which is stationary with respect to the particular guide carriage F1 to F4 and which is arranged at the front end of the guide carriage F2 to F3. The control rocker 10 however does not only support the support pin 9, which is guided in the guide grooves 8 of the lamella carrier T1–T3 which is in front of the control rocker 10. The control rocker 10 is also connected to the rear lamella L2 to L4 so as to be supported in the pivot direction of the lamella such that the control rocker 10 can pivot in accordance with the pivot movement of the respective lamella L1 to L4 out of its position flat with the roof structure to the upwardly tilted position.

The control rocker 10 is connected to the, based on the driving direction F of the vehicle, next rear lamella L1 to L4 by way of an elongated hole structure 12, in which a guide pin 13 is received that extends from the lamella carrier T1–T4 of the rear lamella L1–L4 as it is apparent particularly from FIGS. 9, 10, and 11.

With respect to the guide carriage F1, which is the—in driving direction—front most guide carriage and has, at its front end, no support structure for a front lamella, as the control rocker 10 has no guide function for a front lamella but it is kept the same anyway for other reasons which will be addressed later.

Also, the last lamella L4 is not guided by a control rocker 10, but a support pin 14 is provided which is stationary with respect to the guide carriage F5. The support pin 14 is so arranged that, in connection with a specially formed guide slot 8, it provides for the desired up-tilting movement of the last lamella L4, whenever the lamella arrangement is moved in the opening direction, that is opposite to the driving direction F, over the front guide carriage F1, which is provided with a drive that is not shown. The drive which acts on the first guide carriage F1, which may be a push type cable drive, is symbolized by the arrow 27.

The lamellas L1 to L4 are interlocked by way of the control rockers 10, which are supported by the guide carriages F2 to F5 until, by tilting the respective rear lamella, beginning with the lamella L4 and the control rocker 10 pivotally connected thereto, the lock of this control rocker 10 with the lamella L3 to L1 in front thereof or the lamella carrier T3 to T1 thereof is released. For the locking the control rocker 10 includes an end portion 15, which extends in travel direction F beyond its pivot axis 11 on the respective guide carriage F5–F2 and which overlaps a stop 16 of a lamella when the lamellar roof is closed. The stop 16 is for example a projection at a side of the respective lamella carrier T3 to T1 which, in adaptation to the end part 15 has a curved engagement track so that, in accordance with the angular position of the control rocker 10 with respect to the guide carriage F3 to F1, the thrust engagement is released during opening of the roof. Upon movement of the roof into the closed position, the control rocker 10 can pivot into an overlap position with the stop so that, upon further displacement of the lamellas L toward their closed position, a position is reached wherein thrust engagement is provided.

FIG. 2 complements FIG. 1 and the description provided in connection with FIG. 1 concerning the lamellar roof design with a view of the lamella guide structure as seen from the opposite side, that is from the outside of the vehicle. In this view, the locking elements 17 in the form of locking levers are visible. They are disposed in front of the control rockers 10, which are not shown in the FIG. 4 and which, in addition to the control rockers 10, are provided the guide carriages F2, F3 and F4 disposed between every two lamellas L1 and L2, L2 and L3, L3 and L4. By means of those locking elements 17, the guide carriages F2 and F3, F3 and F4 as well as F4 and F5 are interlocked when in the open position of the lamellar roof the carriages are moved into abutment with one another. The locking levers 17 have all about the same length as the control rockers 10. They extend toward the rear guide carriage F3 or, respectively, F4 and F5. The pivot axis of the locking levers 17 is disposed in the front area of the guide carriage and preferably co-axially with the pivot axis 11 of the control rocker 10 supported by the same guide carriage. As a result, only a single pivot shaft may be provided which is expedient from a manufacturing and tolerance point of view.

The locking levers 17 are each controlled by the lamellas L1–L3 or respectively, the lamella carriers T1–T3, disposed in front of the guide carriage supporting the respective locking lever 17. In the exemplary embodiment, the free edge of the lamella carrier T1 to T3 remote from the respective lamella forms an engagement edge 18, which extends essentially along the respective guide slot 8. The engagement edge 18 is disposed, adjacent to rear end area of the guide slot 8, in close proximity to the lamella and has a step 19 providing a stop for an engagement projection 20 of the locking lever 17.

In the example, the support projection 20 is in the form of a pin, which extends sidewardly from the locking lever 17 and below the respective lamella carrier T1 to T3. The step 19 forms a cam, which is inclined toward the respective lamella and therefore provides for a smooth transition to the engagement edge 18 in the area thereof extending along the guide slot 8.

At its free end remote from the pivot axis 11, the locking lever 17 is provided with a locking hook 21, to which a cam structure 22 on the guide carriage next in the direction opposite the travel direction F, is assigned which cam structure extends to an engagement recess 23. Also, the transition between the cam structure 22 and locking engagement recess 23 is smooth. The surface of the engagement recess 23 extends with respect to its side 24 adjacent the cam structure 22 at an obtuse angle.

Preferably, the locking lever 17 is spring-biased into engagement with the respective engagement edge 18 or, respectively, the engagement surface formed by the step 19. In this way, a stop is provided at the engagement edge 18 or the step 19 thereof with respect to the closed position of the roof 4 also for intermediate positions in the transition to the fully open position of the roof 4, wherein the locking lever 17 does not yet engage the support surface 22 of the guide carriage in opening direction adjacent carriage. Depending on the spring force, support is also provided in the longitudinal direction of the vehicle in opposition to the force required for the opening of the lamellar roof when the support projection 20 abuts the step area 19. As a result, the control rocker 10 and the locking lever 17 have both support functions and complement each other. With the arrangement of the respective support surfaces and the timing obtained by the design conditions, a mutual load relief is achieved and excessively high edge stresses and the resulting wear can be avoided.

In the arrangement according to the invention, also unavoidable tolerances are relatively easily manageable since, with regard to each individual guide carriage FÜ, the lamella carrier LA, the locking lever 17 and the control rocker 10 are all supported directly on the guide carriage FÜ so that tolerances do not add up. The arrangement provides also for a compact design as far as the width is concerned. It has been found to be advantageous if the control rocker 10 supports the support pin 19 extending into the guide slot 8 at both sides since the guide stability is improved thereby. Accordingly, the stop 16 between the end part 15 of the control rocker 10 and the front most lamella LA is recessed at the side adjacent the respective lamella carrier TR in order to provide for the necessary passage clearance.

Particularly from FIG. 11, it is apparent that the control rockers 10 are provided at their one end with the elongated opening 12, with a catcher opening 25 which is open toward the elongated opening 12 and which is delimited by a web 26 near the end of the control rocker and extends parallel to the lamella carrier TR. The control rocker supported on the guide carriage F4, that is, its support pin 9, has entered the front end position in the guide slot 8 of the lamella carrier when the control rocker 10 has reached its end position as shown in FIG. 1 for the guide carriages F3 and F4 and their respective guide mechanisms. As a result, in accordance with the upwardly tilted rear ends of the lamella carrier T3 and the lamella L3 in the open position thereof also the control rocker 10 is tilted upwardly which is supported on the guide carriage F3. The control rocker 10 is connected to the lamella L3 by way of the guide pin 13 which is shown in FIG. 1 only by dashed lines and which is received in the elongated hole 12 of the control rocker 10. In this position of the control rocker 10, the catcher opening 25 has reached the support pin 9 of the control rocker 10 of the guide carriage F4. The control rocker 10 is mostly not visible in FIG. 1 as it is covered by the lamella carrier T3. When support pin 9 has entered the catcher opening 25, an engagement is provided between the control rockers 10 of which one is supported on the guide carriage F3 and the other is supported on the guide carriage F4. The two control rockers together then form a support triangle arrangement whose base is formed by the guide carriages F3 and F4 and the support pin 9 forming the apex. The control rockers 10 are firmly engaged with one another so that a very stable support for the lamellas LA in their upwardly tilted position is achieved. This is necessary to provide for a vibration and rattle-free support of the lamella carrier TR when the roof is open.

The guide structure according to the invention is suitable for lamella roof designs, in which the lamellas LA are joined with respect to each other and with respect to the roof opening 1 in a sealed manner, which is not shown in detail. However, the guide structure may also be used in connection with a roof design wherein the lamellas form only support structures for a roof cover material that is a roof skin. The roof skin is attached to the individual lamellas which define the pleat hoops. When the roof is open, the roof cover is raised and the pleats are formed by the raised hoops.

FIG. 2 shows schematically such a flexible roof cover 28 on top of the lamellas L1 to L4, the flexible roof cover 28 being indicated by a dashed line.

FIG. 11 shows that the lamellas LA form only a support structure if they are covered by a roof cover 28. The lamellas may therefore be provided with cut-outs to save weight. With such a design, a support of the lamellas by guide rockers 10 which keep the cover under tension is particularly advantageous since fluttering of the flexible roof cover 28 as a result of the wind forces can then be avoided. The lamella structure with cut-outs for the support of the flexible roof cover, which is partially firmly cemented to the lamella structure, is expedient also for the formation of the pleats upon opening of the roof since in this way in certain areas an increased pleat space can be provided.

Different from the embodiments shown, the engagement of the locking levers 17 with the lamella carrier or the guide carriages may also be established by way of members guided in guide grooves or slots wherein the locking levers 17 include pins or support bolts which extend into the guide grooves.

What is claimed is:

1. A lamellar roof for a roof opening (1) of a motor vehicle comprising at least front and rear lamella sections (L1–L4) guided in the roof opening so as to be movable between a closed position, in which the roof opening (1) is closed by a planar side-by-side arrangement of said lamella sections, and an open position, in which the lamella sections (L1–L4) are tilted upwardly and moved backwardly into overlapping relationship, a lamella guide mechanism for guiding said lamella sections during movement between said closed and open positions, including lamella section carriers (T1–T4) and guide carriages (F1–F5), each lamella section carrier (T1–T4) being supported on two adjacent guide carriages, each guide carriage (F1–F4) except for a rearmost carriage (F5) having a pivot axis (7) for the—in travel direction of the vehicle—adjacent rear lamella section carrier (T1–T4) and a, in slide direction displaced, pivot axis (11) for a control rocker (10), which supports an adjacent front lamella section carrier (T1 to T4) and also a rearwardly adjacent lamella section carrier and which is coupled to the front lamella section carrier by way of a guide groove (8) extending along the front lamella section carrier such that said control rocker (10) is movable out of its basic closed roof position to a roof opening position, in which it raises the rear edge of an adjacent lamella section to tilt the adjacent lamella section upwardly, and said pivot axis (7) for said adjacent rear lamella section carrier being arranged in the rear end area of said guide carriage (F2) said control rocker (10) extending from the pivot axis (11) thereof toward the adjacent rear lamella section carrier and being engaged between the pivot axis (7) of the adjacent rear lamella section carrier and the pivot axis (11) of said control rocker (10) on said guide carriage in the guide slot (8) of said front lamella section carrier (T1), and said control rocker (10) having a projection extending in opening direction and being supported on said adjacent rear lamella section carrier.

2. A lamellar roof according to claim 1, wherein said control rocker (10) biases, in the closed position of the lamellar roof (4), the—in opening direction of the roof—adjacent front lamella section carrier toward the guide carriage supporting the control rocker (10).

3. A lamellar roof according to claim 2, wherein, in a closed position of the lamellar roof, said control rocker (10) includes an overlap area to a stop (16) of the longitudinally supported adjacent front lamella section carrier.

4. A lamellar roof according to claim 3, wherein said stop (16) is part of said longitudinally supported adjacent front lamella section carrier.

5. A lamellar roof according to claim 1, wherein, in the open position of the lamellar roof (4), all the guide carriages (F1–F5) moved into engagement with one another are interlocked.

6. A lamellar roof according to claim 5, wherein, for the interlocking of adjacent guide carriages (F1–F5), a locking element (17) is provided.

7. A lamellar roof according to claim 6, wherein said locking element is a locking lever (17), which is supported on each guide carriage (F1–F4) except the, in opening direction of the roof, front guide carriage (F5) and is engageable with the guide carriage which, in opening direction of the roof, is the next adjacent guide carriage.

8. A lamellar roof according to claim 7, wherein said locking lever (17) is supported in a support area of the guide respective guide carriage which is displaced in closing direction (F) of the roof with respect to an area of the guide carriage carrying the pivot axis (7) of the rearwardly adjacent lamella section carrier.

9. A lamellar roof according to claim 8, wherein said pivot axes (11) of the control rocker (10) and of a locking lever (17) which are disposed on the same guide carriage are co-axial.

10. A lamellar roof according to claim 7, wherein the control rocker (10) and the locking lever (17) which are arranged on the same guide carriage extend from their pivot axis (11) in the same direction.

11. A lamellar roof according to claim 7, wherein, the locking lever (17) is pivotally supported with one end thereof on a guide carriage and has at its opposite end a locking hook (21) which, in an open position of the roof, is engaged in an engagement recess (23) of the adjacent guide carriage following in the opening direction of the lamellar roof.

12. A lamellar roof according to claim 11, wherein said locking lever (17) is supported against the adjacent front lamella section carrier of the respective guide carriage.

13. A lamellar roof according to claim 12, wherein each lamella section carrier (T1–T4) has an edge (18) opposite the respective lamella section supported thereon, said edge (18) forming a support edge for said locking lever (17).

14. A lamellar roof according to claim 11, wherein said locking lever (17), which is supported against the adjacent guide carriage next in the opening direction, has a support surface (22) which ends in a reception opening (24).

15. A lamellar roof according to claim 14, wherein said locking lever (17) has a locking hook (21) at its end in the reception opening (24).

16. A lamellar roof according to claim 13, wherein said support edge (18) extending along said guide slot (8) of the lamella carrier forms at the end of said guide slot (8) in the opening direction of the lamellar roof (4) a step (19).

17. A lamellar roof according to claim 16, wherein said step (19) is disposed in a transition to said support edge (18) and is inclined so as to form a ramp.

18. A lamellar roof according to claim 13, wherein said locking lever (17) is in contact with said support edge (18).

19. A lamellar roof according to claim 1, wherein the control rocker (10) engaging the adjacent front lamella section moves in the open position of the roof into an overlapping engagement position with the control rocker (10) of the—in opening direction—following control rocker (10).

20. A lamellar roof according to claim 19, wherein the part of said control rocker (10) against which, in the closing direction, the preceding control rocker (10) is supported in the opening direction of the lamellar roof (4), is formed by a part (pin 9) of the control rocker (10) which extends through the guide slot (8) of the lamella section between these control rockers (10).

* * * * *